United States Patent Office 3,354,105

Patented Nov. 21, 1967

3,354,105

COAL TAR POLYHYDROXYETHER COMPOSITION

George E. Trieschock, Westfield, N.J., assignor, by mesne assignments, to United States Steel Corporation, Pittsburgh, Pa., a corporation of Delaware No Drawing. Filed June 1, 1964, Ser. No. 371,769
18 Claims. (Cl. 260—28)

This invention relates to a thermoplastic coal tar pitch composition.

Coal tar pitch epoxy resin formulations have proven very useful, Whittier et al. Patent No. 2,765,288. However, there have not been prepared thermoplastic powder compositions containing coal tar pitch and epoxy resins despite the fact that powdered compositions are frequently desirable for fluidized bed and other coating techniques.

Accordingly it is an object of the present invention to prepare a powdered thermoplastic coal tar pitch composition.

Another object is to prepare a coal tar pitch composition having a high melting point.

An additional object is to prepare more flexible and stronger coal tar pitch formulations.

Yet another object is to improve the adhesive characteristics of coal tar pitch compositions.

A further object is to improve the toughness and impact strength of the coal tar pitch formulations.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be obtained by employing mixtures of coal tar pitch with high molecular weight linear condensation products of a dihydric phenol and epichlorohydrin (or glycerol monochlorhydrin) having essentially no epoxy functionality. Such compounds have the basic formula

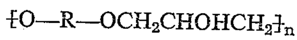

$$\left[ O—R—OCH_2CHOHCH_2 \right]_n$$

where $n$ is 80 or greater, usually 100 or greater and can be as much as 10,000 or more and R is the divalent residue after removal of both hydroxyl hydrogens of a dihydric phenol. Such compounds have an epoxy equivalency of greater than 5000 and preferably above 20,000.

As phenols for making the above condensation products there can be used bis(4-hydroxyphenyl)-2,2-propane (bisphenol A); resorcinol; catechol; hydroquinone; 2,4′-dihydroxybenzophenone; bis(4-hydroxyphenyl) - 1,1-isobutane; bis(4-hydroxyphenyl) methane; bis(4-hydroxyphenyl)-1,1-ethane; bis(4-hydroxyphenyl)-2,2-butane; bis(4-hydroxy-2-methylphenyl)-2,2-propane; bis(4-hydroxy-2-t-butylphenyl)-2,2 - propane; bis(2 - hydroxynaphthyl) methane; 4,4′-dihydroxyphenyl sulfone; 4,4′-dihydroxy biphenyl; 1,5-dihydroxy naphthalene and bis(4-hydroxy 2,6-dichlorophenyl) 2,2-propane.

The preferred linear condensation products are linear bisphenol A epichlorhydrin condensation products having essentially no epoxy functionality. Products of this type are available commercially. One such product is available from Shell under the trademark Eponol-55. Eponol-55 is a linear condensation product of bisphenol A and epichlorhydrin, has a molecular weight of 200,000, an epoxy equivalency above 100,000 and a hydroxyl equivalent of 0.35/100 gms. It is available under the code name Eponol-55-B-40 as a 40% by weight nonvolatilies in methyl ethyl ketone. It is also available under the code name Eponol-55-L-32 as a 32% by weight solution in ethylene glycol ethyl ether acetate (Cellosolve acetate). It is also soluble in a solvent composed of 20% Cellosolve acetate, 20% methyl isobutyl carbinol, 30% methyl ethyl ketone and 30% toluene. Any of these solutions of the linear, thermoplastic Eponol-55 can be used according to the invention.

Other suitable commercial linear, thermoplastic bisphenol A epichlorhydrin resins which can be used are the Union Carbide Phenoxy resins PKDA-8500 having molecular weights of 20,000 and 30,000 and 6% free hydroxyl. This resin is normally employed as a 25% nonvolatiles solution in methyl ethyl ketone.

Unless otherwise indicated all parts and percentages are by weight.

The coal tar pitch can be in isolated form or as an ingredient in whole coal tar or refined coal tar, as a coal tar fraction such as RT-5 and RT-9 (road tars), a cut back pitch. Typical examples of suitable coal tar pitches include carbon pitch (90° C. Ring and Ball softening point), fiber pitch (70° C. R. and B. softening point), Wilton pitch (50° C. R. and B. softening point) as well as coal digested pitches.

The coal tar pitch is 40 to 98% and the linear thermoplastic dihydric phenol epichlorhydrin epoxy functionality free resin 2 to 60% of the total of these two materials. The coal tar pitch is preferably 75 to 95% of the total of the two materials.

Preferably the composition also includes 2–25% based on the total composition of a diolefin-acrylonitrile rubber. The diolefin can have 4–6 carbon atoms. Thus there can be used butadiene-acrylonitrile rubber, isoprene acrylonitrile rubber and hexadiene-acrylonitrile rubber. The rubber is preferably of the high acrylonitrile type, e.g., 30–50% acrylonitrile. A specific example of such a rubber is Paracril C a butadiene-acrylonitrile rubber having about 40% acrylonitrile and a Mooney viscosity of 85 at 212° F. as a 20% solution in methyl ethyl ketone.

Also there is preferably included 2–10% based on the total composition of a liquid butadiene or isoprene polymer, e.g., having a molecular weight of 2000 to 10,000. The liquid butadiene or isoprene polymer can be liquid polybutadiene, liquid butadiene-styrene copolymer or liquid partially depolymerized natural rubber (e.g., Mol. Wt. 5000) but is preferably a liquid butadiene-acrylonitrile copolymer such as Hycar 1312 having 30% acrylonitrile and a specific gravity of 0.98. Hycar 1312 is medium high in acrylonitrile content and has a molecular weight between 2000 and 5000. It is not desirable to add more than 10% of the liquid butadiene polymer since if too much of this material is added the product becomes sticky.

There can also be employed 0–40%, preferably 10–25% based on the total composition of fillers, e.g., sand, iron oxide, talc, mica, coal, aluminum powder, finely divided mineral fillers, e.g., titanium dioxide, granite, etc.

The powder normally passes a 50 mesh screen (Tyler series). The materials employed in the formulation serve the following functions:

(1) The coal tar pitch imparts water resistance to the product, prevents loss of adhesion during immersion in water and gives high dielectric strength to the product.

(2) The linear condensation product of the dihydric phenol and the epichlorhydrin improves the adhesion and toughness of the product and imparts high impact strength.

(3) The diolefin acrylonitrile rubber imparts toughness and flexibilizes the pitch. It also imparts improved impact strength and reduces cold flow. Additionally it improves the oil resistance and reduces temperature susceptibility, e.g. it reduces the brittleness of the product at low temperature and softening at high temperature.

(4) The liquid butadiene polymer improves the flow characteristics and adhesion and gives some tack to the composition.

(5) The filler can be employed to reduce the cost, vary the color, increase the hardness and improve the impact properties.

The products of the invention are useful to coat pipes of concrete or metal, e.g. iron, copper, aluminum, brass or steel. The pipes can be coated either inside or out. The products also can be used to coat wires made of silver or any of the above-mentioned metals. They can also be employed as coatings for concrete or metal slabs, floors, walkways, pavements, etc.

In some instances it is desired to extrude the composition, e.g. by heating. As indicated the compositions of the invention are suitable for fluid bed applications, e.g. as shown in Gemmer Patent No. 2,844,489 or Manasia Patent No. 3,102,823.

In some cases it is desirable to prevent caking and agglomeration of the powder particles. Antiblocking agents are added for that purpose. The antiblocking agent must be one which does not hurt the flow out and adhesion. Hence materials such as asbestos, silica, clays, mica and the like cannot be used. It has been found that an extremely effective antiblocking agent is an aqueous elastomer latex. The particles of the powder composition are encapsulated in the latex and then dried, e.g. tray or spray dried. Alternatively the latex can be sprayed on the powder composition as it is being mixed. The elastomeric latex solids are used in an amount of 0.05 to 2% of the total pitch composition, preferably 0.25–1%. The latex is usually 30–50% solids although this can be varied.

Suitable elastomeric latices include polyethylene latex (e.g. Spencer Poly EM 20026 which contains 40% solids), polyvinyl chloride latex, (e.g. 35% solids), saran latex (e.g. vinylidene chloride acrylonitrile latex 40% solids), natural rubber latex, butadiene-styrene latex, polyisobutylene latex, butyl rubber latex (e.g. isobutylene-isoprene 98.5:1.5), butadiene-acrylonitrile latex.

The products of the invention are stable and non-cold flowing powders. It has been found that the products of the invention either with or without adding the elastomeric latex have higher melting (or softening) points than the coal tar pitch employed.

Thus the formulation used in Example 1 below and which contained a 90° C. coal tar pitch had a softening point of 150° C.

*Example 1*

| | Parts |
|---|---|
| Carbon pitch (90° C. R. and B. softening point) | 56 |
| Paracril | 9 |
| Eponol-55–B–40 | 22.5 |
| Hycar 1312 | 6 |
| Red iron oxide | 20 |

The pitch was melted and the Eponol-55–B–40 added at 150° C. and the methyl ethyl ketone solvent therein stripped off (of the 22.5 parts of Eponol-55–B–40 there were 9 parts solids and 13.5 parts of the methyl ethyl ketone solvent). Then there were added the Paracril C, the red iron oxide and finally the Hycar 1312. The mixture was thoroughly dispersed by milling at 150° C. (mixing can be done at 125–200° C. A Werner-Pfleiderer mixer can also be used in these temperature ranges). The product was cooled and pulverized to minus 50 mesh (Tyler standard screen). The particle size of the powder can be varied, e.g. from 40 mesh to minus 325 mesh.

*Example 2*

| | Parts |
|---|---|
| Coal tar pitch (70° C. R. & B. softening point) | 62 |
| Eponol-55–B–40 | 15 |

On a dry basis there were 6 parts of the Eponol-55 (the other 9 parts of Eponol-55–B–40) in the above formulation was the methyl ethyl ketone solvent.

*Example 3*

There was sprayed on 100 parts of the minus 50 mesh powder obtained in Example 1 a 40% aqueous, polyethylene latex (Spencer Poly EM 20026) in an amount of 0.625 part (0.25 part polyethylene). This mixture was tumbled and then tray dried.

*Example 4*

4 parts of a 25% solids aqueous polyvinyl chloride latex were tumbled with 100 parts of the minus 50 mesh powder obtained in Example 1 and the mixture was then spray dried.

*Example 5*

| | Parts |
|---|---|
| Paracril C | 8 |
| Eponol-55–B–40 | 15 |
| Hycar 1312 | 4 |
| Coal tar pitch (carbon pitch) | 62 |
| Iron oxide (filler) | 20 |

On a dry basis there was 6 parts of Eponol-55 since Eponol-55–B–40 is a 40% solution in methyl ethyl ketone.

*Example 6*

| | Parts |
|---|---|
| Union Carbide Phenoxy PKDA–8500 (Mol. Wt. about 25,000) | 6 |
| Paracril C | 8 |
| Hycar 1312 | 4 |
| Coal tar pitch (70° C. R. & B. softening point) | 62 |

In the following examples there was employed Eponol-55–B–40 but the proportions are calculated on a dry basis, e.g. if 15 parts of the Eponol-55–B–40 were employed then the Eponol-55 would be 6 parts. The pitch employed was a 70° C. (R. and B. softening point) pitch. In order to make comparisons in the effect of the other components on the compositions the red iron oxide filler was kept constant.

| Example | Parts | | | | |
|---|---|---|---|---|---|
| | Eponol-55 | Paracril C | Hycar 1312 | Pitch | Iron Oxide |
| 7 | 12 | 2 | 2 | 54 | 20 |
| 8 | 8 | 8 | 5 | 59 | 20 |
| 9 | 6 | 8 | 4 | 62 | 20 |
| 10 | 6 | 6 | 4 | 64 | 20 |
| 11 | 6 | 6 | 2 | 66 | 20 |
| 12 | 6 | 7 | 3 | 64 | 20 |
| 13 | 12 | 4 | 4 | 60 | 20 |
| 14 | 9 | 9 | 6 | 56 | 20 |

The composition of Example 14 was the best of all the formulations as a coating material and that of Example 8 was next best. The composition of Example 10 was somewhat softer than that of the other formulations.

The powders prepared according to the present invention can be applied to the inside and outside of a pipe by a fluid bed dip, to the inside of the pipe by conventional spray techniques and to the outside of the pipe by a conventional fog procedure. Other conventional coating procedures can also be employed.

What is claimed is:

1. A composition comprising coal tar pitch and a polymer having the formula

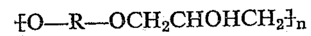

$$\lbrack O—R—OCH_2CHOHCH_2 \rbrack_n$$

where $n$ is an integer of at least 80 and R is the divalent residue of a dihydric phenol after removal of both hydroxyl hydrogens, wherein the pitch is 40 to 98% of the total pitch and polymer.

2. A composition according to claim 1 wherein the pitch is 75 to 95% of the total of pitch and polymer.

3. A composition according to claim 1 including a rubbery diolefin-acrylonitrile polymer.

4. A composition according to claim 1 including a liquid polymer of a diolefin having 4 to 5 carbon atoms.

5. A composition according to claim 1 wherein the pitch is 40 to 98% of the total of the pitch and polymer and there is also included in the composition 2–25% of a diolefin-acrylonitrile rubber based on the total composition and 2–10% of the total composition of a liquid polymer of a conjugated diolefin having 4 to 5 carbon atoms.

6. A composition according to claim 5 including a filler in an amount up to 40% of the total composition.

7. A free flowing powder comprising the composition of claim 1 in powder form encased in an elastomer.

8. A composition comprising coal tar pitch and an aromatic polymer having the formula

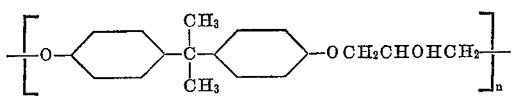

wherein $n$ is an integer of at least 80, and said coal tar pitch being 40 to 98% of the total pitch and aromatic polymer.

9. A composition according to claim 8 including a rubbery diolefin-acrylonitrile copolymer.

10. A composition according to claim 9 including a liquid polymer of a diolefin having 4 to 5 carbon atoms, said liquid polymer having a molecular weight of 2000 to 10,000.

11. A composition comprising (1) coal tar pitch (2) an aromatic polymer having the formula

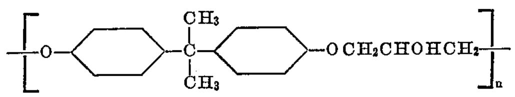

where $n$ is an integer of at least 80, (3) a rubbery butadieneacrylonitrile copolymer (4) a liquid butadiene polymer having a molecular weight of 2000 to 10,000 and (5) a filler, said coal tar pitch being 40 to 98% of the total of the pitch and aromatic polymer, said rubbery copolymer being 2–25% of the total composition, said liquid butadiene polymer being 2–10% of the total composition, said filler being up to 40% of the total composition.

12. A composition according to claim 11 wherein said coal tar pitch is the major constituent of the composition.

13. A composition comprising coal tar pitch and a linear bisphenol A-epichlorhydrin condensation product having a molecular weight of at least 20,000 and having essentially no epoxy functionality, wherein the pitch is 40 to 98% of the total pitch and condensation product.

14. A process of preparing a free flowing powder comprising adding a minor amount of an elastomer latex to a composition comprising coal tar pitch and a polymer having the formula $$\text{-}[O\text{—}R\text{—}OCH_2CHOHCH_2]_n\text{-}$$

where $n$ is an integer of at least 80 and R is the divalent residue of a dihydric phenol after removal of both hydroxyl groups, wherein the pitch is 40 to 98% of the total of said pitch and polymer, and drying the powder containing the latex.

15. A process according to claim 14 wherein the pitch is 40 to 98% of the total of said pitch and polymer and the latex is added in an amount to provide 0.05 to 2% of elastomer based on the final dry composition.

16. A process of preparing a free flowing powder comprising adding a minor amount of an elastomer latex to a composition comprising (1) coal tar pitch, (2) a linear polymer of bis(4-hydroxyphenyl)-2,2-propane having a molecular weight of at least 20,000 and having essentially no epoxy functionality, (3) a rubbery butadiene acrylonitrile copolymer and (4) a liquid butadiene polymer and drying said composition, said latex being added in an amount to provide 0.05 to 2% of elastomer based on the final dry composition, said coal tar pitch being 40 to 98% of the total of said pitch and linear polymer, said rubbery copolymer being 2–25% of the total composition and said liquid butadiene polymer being 2–10% of the total composition.

17. A process according to claim 16 wherein the coal tar pitch is the major constituent of the composition.

18. A process according to claim 17 wherein said composition includes a mineral filler in an amount of 40%.

No references cited.

JULIUS FROME, *Primary Examiner.*

H. S. KAPLAN, *Assistant Examiner.*